US012645363B2

(12) United States Patent
Zang

(10) Patent No.: US 12,645,363 B2
(45) Date of Patent: Jun. 2, 2026

(54) DISTRIBUTED STORAGE SYSTEM CONTROL METHOD AND APPARATUS, AND READABLE STORAGE MEDIUM

(71) Applicant: Suzhou MetaBrain Intelligent Technology Co., Ltd., Suzhou (CN)

(72) Inventor: Linjie Zang, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 18/856,414

(22) PCT Filed: Dec. 22, 2022

(86) PCT No.: PCT/CN2022/141132
§ 371 (c)(1),
(2) Date: Oct. 11, 2024

(87) PCT Pub. No.: WO2023/197670
PCT Pub. Date: Oct. 19, 2023

(65) Prior Publication Data
US 2025/0258610 A1      Aug. 14, 2025

(30) Foreign Application Priority Data
Apr. 13, 2022    (CN) .......................... 202210389331.3

(51) Int. Cl.
*G06F 3/06* (2006.01)
(52) U.S. Cl.
CPC .......... *G06F 3/0613* (2013.01); *G06F 3/0659* (2013.01); *G06F 3/067* (2013.01)
(58) Field of Classification Search
CPC ...... G06F 3/0613; G06F 3/0659; G06F 3/067; G06F 3/06; G06F 3/065; G06F 3/0604; G06F 3/0632

(Continued)

(56) References Cited

U.S. PATENT DOCUMENTS

| | | | |
|---|---|---|---|
| 10,339,101 B1 | 7/2019 | Gupta | |
| 2014/0324785 A1 | 10/2014 | Gupta et al. | |
| 2021/0182246 A1* | 6/2021 | Foque ................. | G06F 16/2365 |

FOREIGN PATENT DOCUMENTS

| | | |
|---|---|---|
| CN | 106406750 A | 2/2017 |
| CN | 108196978 A | 6/2018 |

(Continued)

OTHER PUBLICATIONS

International Search Report and Written Opinion of corresponding PCT Application No. PCT/CN2022/141132 dated Mar. 7, 2023 including English translations (13 pages).

(Continued)

*Primary Examiner* — Hosain T Alam
*Assistant Examiner* — Zubair Ahmed
(74) *Attorney, Agent, or Firm* — Crowell & Moring LLP

(57) ABSTRACT

Disclosed are a distributed storage system control method and apparatus, and a readable storage medium, relating to the technical field of information. According to the distributed storage system control method, after configuration is completed, replica data of a master replica and replica data of a slave replica in a node are written into a log. Meanwhile, transmission of a data storage instruction and writing of storage data are completed by means of the log. After storage data of the master replica is written, an acknowledgment character is fed back to a client. And after the client receives the acknowledgment character, writing of storage data of the slave replica is performed.

19 Claims, 4 Drawing Sheets

(58) Field of Classification Search
    USPC .................................................. 711/154, 100
    See application file for complete search history.

(56)                References Cited

FOREIGN PATENT DOCUMENTS

| CN | 109992219 A | 7/2019 |
| CN | 111368002 A | 7/2020 |
| CN | 111813334 A | 10/2020 |
| CN | 113204530 A | 8/2021 |
| CN | 113535656 A | 10/2021 |
| CN | 114637475 A | 6/2022 |

OTHER PUBLICATIONS

Search report of corresponding CN Priority Application No. CN202210389331.3 Dated May 30, 2024 (2 pages).
Notification to Grant Patent Right for Invention of corresponding CN Priority Application No. CN202210389331.3 dated Jun. 3, 2024 including English translation (3 pages).
Ling Zhan, Chenghao Zhu, Jiguang Wan: Research and Implementation of Heterogeneous Object Replication Storage Policy for Ceph File Systems, Journal of Chinese Computer Systems, No. 9 2017, Sep. 15, 2017, pp. 93-98 (12 pages).

* cited by examiner

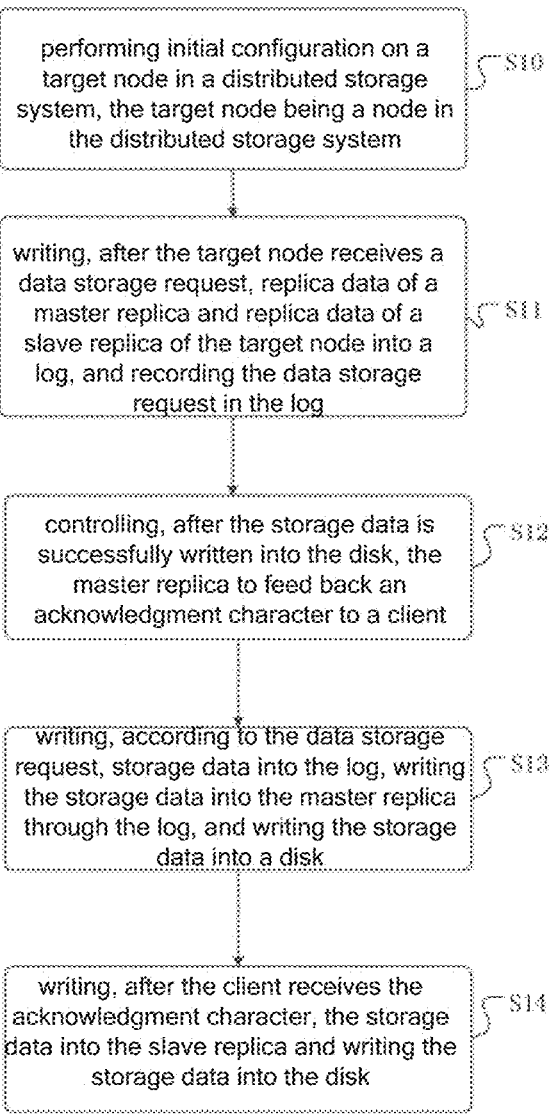

performing initial configuration on a
target node in a distributed storage
system, the target node being a node in
the distributed storage system          S10 writing, after the target node receives a
data storage request, replica data of a
master replica and replica data of a
slave replica of the target node into a
log, and recording the data storage
request in the log          S11 controlling, after the storage data is
successfully written into the disk, the
master replica to feed back an
acknowledgment character to a client          S12 writing, according to the data storage
request, storage data into the log, writing
the storage data into the master replica
through the log, and writing the storage
data into a disk          S13 writing, after the client receives the
acknowledgment character, the storage
data into the slave replica and writing the
storage data into the disk          S14

Fig. 1

DISTRIBUTED STORAGE SYSTEM CONTROL METHOD AND APPARATUS, AND READABLE STORAGE MEDIUM

CROSS-REFERENCE TO RELATED APPLICATION

This application is the national phase application of International Patent Application No. PCT/CN2022/141132, filed Dec. 22, 2022, which claims priority to Chinese Patent Application No. 202210389331.3, filed on Apr. 13, 2022, in China National Intellectual Property Administration and entitled "Distributed Storage System Control Method and Apparatus, and Readable Storage Medium". The contents of International Patent Application No. PCT/CN2022/141132 and Chinese Patent Application No. 202210389331.3 are herein incorporated by reference in their entireties.

FIELD

The present application relates to the technical field of information, and in particular to a distributed storage system control method and apparatus, and a readable storage medium.

BACKGROUND

With exponential growth of data generated by cloud computing and digital transformation, there are new technical requirements for massive data storage. As a result, an application of distributed storage systems is becoming increasingly widespread. To ensure data security and prevent data loss, existing distributed storage systems typically employ a master-slave replica replication method for data writing, synchronizing data content in a master replica and a slave replica to achieve data storage.

In an existing distributed storage system control method, a data object is added to an address map file during program compilation using a dump file analysis tool (Crash). The line number is then located to calculate the placement group (PG) to be passed. After writing to the master replica, the data is replicated to the slave replica through the master replica. The master replica is then notified upon completion of the data replication to the slave replica. Only after all slave replicas have finished replicating the data and notified the master replica of completion, does the master replica respond to the client, indicating the completion of the write operation. Therefore, in the process of achieving consistency through replica synchronization replication, client requests are in a state of waiting congestion, leading to increased delay costs in data consistency synchronization.

SUMMARY

An object of the present application is to provide a distributed storage system control method, to solve the problem that the current distributed storage system has excessive time cost during data writing.

To solve the above technical problems, the present application provides a distributed storage system control method, including the following steps:

performing initial configuration on a target node in a distributed storage system, the target node being a node in the distributed storage system;

writing, after the target node receives a data storage request, replica data of a master replica and replica data of a slave replica of the target node into a log, and recording the data storage request in the log;

writing, according to the data storage request, storage data into the log, writing the storage data into the master replica through the log, and writing the storage data into a disk;

controlling, after the storage data is successfully written into the disk, the master replica to feed back an acknowledgment character to a client; and writing, after the client receives the acknowledgment character, the storage data into the slave replica and writing the storage data into the disk.

In some embodiments, before writing, according to the data storage request, storage data into the log, and writing the storage data into the master replica through the log, and writing the storage data into a disk, the method further includes:

writing the storage data into a backup log, the backup log being a log stored in a solid-state storage hard disk through separate partition mounting;

extracting the storage data from the backup log and replicating the storage data to a substitute master replica when there is a failure during the process of writing the storage data into the slave replica, and writing the storage data into the disk;

replicating the storage data in the substitute master replica to the slave replica; and performing a step of the writing the storage data into the slave replica, and writing the storage data into a disk when there is no failure during the process of writing the storage data into the slave replica and writing the storage data into the disk.

In some embodiments, before the performing initial configuration on a target node in a distributed storage system, the method further includes:

detecting node resources of different nodes, where the node resource includes a memory usage rate and a central processing unit (CPU) usage rate of the node, as well as a unit ratio of a replica process disk;

generating a weight value of each node according to the node resources, where the memory usage rate, the CPU usage rate, and the unit ratio of the replica process disk in the node resources are negatively correlated with the weight value;

determining a request-response order in each node according to the weight value of each node, where the weight value is positively correlated with the request-response order; and selecting a node with a highest weight value as the target node.

In some embodiments, the method further includes:

deleting, every preset time, part or all of the log according to a situation of writing the storage data into the disk.

In some embodiments, the method further includes:

mapping, when a storage data read request is received, the storage data read request to a slave replica in the node with the highest weight value;

determining whether a log corresponding to the storage data read request exists;

in response to an existence of the log corresponding to the storage data read request, reading the storage data from the master replica; and in response to no existence of the log corresponding to the storage data read request, reading the storage data from the slave replica.

In some embodiments, the performing initial configuration on a target node in a distributed storage system includes:

controlling the client to establish a link with Monitor, acquiring address information about a cluster, and sending a handle of the cluster to the Monitor;

controlling the target node to receive configuration information fed back from the Monitor; and controlling the target node to read cluster configuration parameters in the Monitor and receive configuration files that has been set.

In some embodiments, the method further includes:

controlling, after the data storage request is responded to, the slave replica to feed back an acknowledgment character to the client.

To solve the above problems, the present application further provides a distributed storage system control apparatus, including:

a configuration module, configured to perform initial configuration on a target node in a distributed storage system, the target node being a node in the distributed storage system;

a master writing module, configured to write, after the target node receives a data storage request, replica data of a master replica and replica data of a slave replica of the target node into a log, and record the data storage request in the log;

a sending module, configured to write, according to the data storage request, storage data into the log, and write the storage data into the master replica through the log, and write the storage data into a disk;

a feedback module, configured to control, after the storage data is successfully written into the disk, the master replica to feed back an acknowledgment character to a client; and a slave writing module, configured to write, after the client receives the acknowledgment character, the storage data into the slave replica, and write the storage data into the disk.

In some embodiments, the apparatus further includes:

a backup writing module, configured to write the storage data into a backup log, where the backup log is a log stored in a solid-state storage hard disk through separate partition mounting;

an extraction module, configured to extract the storage data from the backup log and replicate the storage data to a substitute master replica when there is a failure during the process of writing the storage data into the slave replica and write the storage data into the disk; and a replication module, configured to replicate the storage data in the substitute master replica to the slave replica.

In some embodiments, the apparatus further includes:

a detection module, configured to detect node resources of different nodes, where the node resources includes a memory usage rate and a CPU usage rate of the node, and a unit ratio of a replica process disk;

a weight generation module, configured to generate a weight value of each node according to the node resources, where the memory usage rate, the CPU usage rate, and the unit ratio of the replica process disk in the node resources are negatively correlated with the weight value;

a response determination module, configured to determine a request-response order in each node according to the weight value of each node, where the weight value is positively correlated with the request-response order; and a selection module, configured to select a node with a highest weight value as the target node.

In some embodiments, the apparatus further includes:

a deletion module, configured to delete, every preset time, part or all of the log according to a situation of writing the storage data into the disk.

In some embodiments, the apparatus further includes:

a mapping module, configured to map, when a storage data read request is received, the storage data read request to a slave replica in the node with the highest weight value;

a determination module, configured to determine whether a log corresponding to the storage data read request exists, in response to an existence of the log corresponding to the storage data read request, turning on a master read module, and in response to no existence of the log corresponding to the storage data read request, turning on a slave read module;

a master read module, configured to read the storage data from the master replica; and a slave read module, configured to read the storage data from the slave replica.

To solve the above problems, the present application further provides a distributed storage system control apparatus, including a memory, configured to store computer programs; and a processor, configured to implement steps of the above distributed storage system control method when executing the computer programs.

To solve the above problems, the present application further provides a non-transitory readable storage medium, where the non-transitory readable storage medium stores computer programs thereon, and the computer programs, when executed by a processor, implement the steps of the above-distributed storage system control method.

According to the distributed storage system control method of the present application, after configuration is completed, replica data of a master replica and replica data of a slave replica in a node are written into a log. Meanwhile, transmission of a data storage instruction and writing of storage data are completed through the log. After storage data of the master replica is written, an acknowledgment character is fed back to a client. And after the client receives the acknowledgment character, writing of storage data of the slave replica is performed. Compared with the previous method of synchronizing the master replica and the slave replica, in the present application, data is written through log-based, namely, asynchronous non-blocking mode. That is, after the requester sends a request to the receiver, the client does not wait for all replicas to notify the master replica's response and may proceed with other operations. Once the write operation is complete, the completion status and results are notified to the receiver before responding to the client through the master replica. Therefore, in the method, a storage data writing process between the client and a master replica process and a slave replica process is an asynchronous operation, and in a transmission process from the master replica to the slave replica, the client may still normally perform other operations without waiting and does not need to wait for a response after the writing of the master replica and the slave replica is completed as in an existing method, thereby greatly reducing the time cost of data writing.

Since the distributed storage system control apparatus and the computer-readable storage medium provided by the present application correspond to the above-distributed storage system control method, the beneficial effects are the same as those described above.

BRIEF DESCRIPTION OF THE DRAWINGS

To explain the technical solutions of the embodiments of the present application more clearly, a brief introduction will be made to the drawings used in the embodiments. It is obvious that the drawings in the description below are some embodiments of the present application, and the ordinarily skilled in the art may obtain other drawings according to these drawings without creative work.

FIG. 1 is a distributed storage system control method according to some embodiments of the present application;

DETAILED DESCRIPTION

Figure 2:
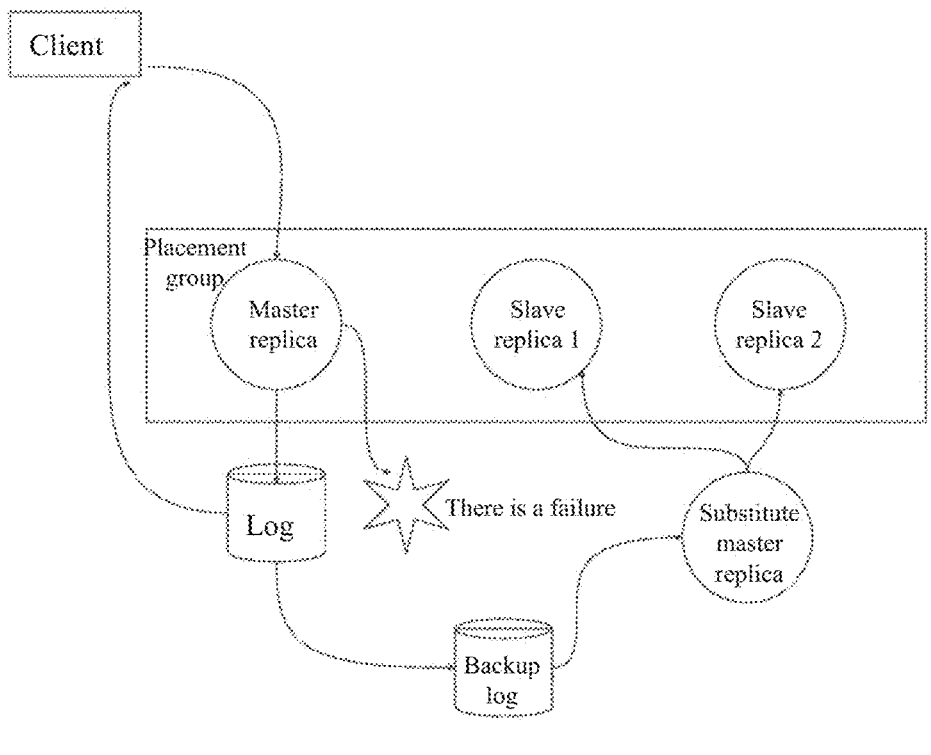
FIG. 2 is a diagram of a data transmission failure handling method according to some embodiments of the present application.

The technical solutions in the embodiments of the present application will be described clearly and completely below in combination with the drawings in the embodiments of the present application. The described embodiments are not all but part of the embodiments of the present application. Based on the embodiments in the present application, all the other embodiments obtained by the ordinarily skilled in the art without involving any inventive effort fall within the scope of protection of the present application.

A core of the present application is to provide a distributed storage system control method, to solve a problem that a current distributed storage system has excessive time cost during data writing. The core lies in adopting the master-slave replica replication method. But for improving a data transmission mode in the method, an asynchronous transmission manner may achieve an effect of solving above problem.

PG is a logical concept, and one PG contains a plurality of object-based storage (OSD) programs. An introduction of a PG layer is to better allocate data and locate data, where OSD is a control program required to run a replica. Afterwards, the replica itself refers to the replica and its corresponding OSD. Correspondingly, the PG is regarded as a data node that contains a plurality of replicas, and will not be repeated hereinafter.

To enable the skilled in the art to better understand technical solutions of the present application, the present application will be described in further detail concerning drawings and implementations.

FIG. 1 is a distributed storage system control method according to some embodiments of the present application. As shown in FIG. 1, the method includes:

S10: Perform initial configuration on a target node in a distributed storage system, the target node being a node in the distributed storage system.

The distributed storage system is to scatter and store data on a plurality of independent devices. Traditional network storage systems adopt centralized storage servers to store all data. Storage servers become a bottleneck of system performance and a focus of reliability and security, which may not meet needs of large-scale storage applications. The distributed network storage system adopts an extensible system structure, which uses a plurality of storage servers to share storage load and a location server to locate storage information, improving the reliability, availability, and access efficiency of the system, and being easy to expand.

The concept of "node" is applied in many fields. In a programming language, a node is the smallest unit of valid and complete structure in an extensible markup language (XML) file. It should be noted that a process of initial configuration in the distributed storage system in the embodiments is not limited, that is, an interface type thereof, a corresponding configuration information transmission process, and the like are not limited. Generally, three protocol access interfaces of object, block, and file system are usually selected for initial configuration, and an input/output (IO) read and write request is sent through a client to perform message processing. In some embodiments, the target node itself, a method of selecting the target node, and the like are not limited. It can be understood that in some embodiments, each node may be selected as the target node, that is, the node that responds to the storage request, and a relatively idle node is the target node in consideration of normal transmission of data.

S11: Write, after the target node receives a data storage request, replica data of a master replica and replica data of a slave replica of the target node into a log, and record the data storage request in the log.

According to a data consistency protection strategy (replica or erasure) of the distributed cluster system. A fault-tolerant mechanism based on replica redundancy involves creating a plurality of copies of original data, each copy being referred to as a replica. Erasure is encoding the original data to obtain redundancy using an erasure coding algorithm and storing the data and redundancy together to achieve a purpose of fault tolerance. K blocks of original data elements are calculated through certain coding to obtain M blocks of redundancy elements, and a total number of replicas of an erasure strategy is K+M.

As can be understood, since a node serves as a carrier of a replica, there is a plurality of replicas in one node. In some embodiments, a number of master replicas and slave replicas themselves, corresponding replica data, and the like are not limited, and the replica data in some embodiments refers to data written by running the master replica, running the slave replica, and related replicas, and will not be described hereinafter.

It should be noted that the logs mentioned in the present application all refer to the journal logs in the computer, which is commonly referred to as the redo log, configured for failure recovery and persistence. It is generally stored in the/journal folder of the data file, and will not be repeated hereafter. In some embodiments, there is no limitation on the data request, the accompanying storage data contents, and the like, but it is understood that the request is sent by the client to the node and then dumped to the log. Specific operation instructions to be expressed in the request is recorded in the log, and the detailed description thereof will not be repeated hereinafter.

S12: Write, according to the data storage request, storage data into the log, write the storage data into the master replica through the log, and write the storage data into a disk.

It can be understood that the storage data is data that needs to be distributed storage processed corresponding to the current storage request, and the type and corresponding content of the storage data are not limited in some embodiments.

It should be noted that writing into the disk in some embodiments refers to sending storage data to a storage disk for long-term storage, and is generally executed by a flushing method, and long-term storage is performed by the storage disk. In some embodiments, the method of writing the storage data into the disk, as well as the data type, content, and the like of the storage data itself are not limited, and it can be understood that the storage data is written into the log, whereby the storage data is dumped through the log, ensuring the transactional and atomic nature of the data transmission operation itself.

S13: Control, after the storage data is successfully written into the disk, the master replica to feed back an acknowledgment character to a client.

In some embodiments, the content of the acknowledgment character fed back by the master replica is not limited. It should be noted that after the storage data is successfully written into the disk, all the storage data in the master replica is sent to the storage disk. As to how to confirm whether the storage data is successfully written into the disk, the data transmission process of the log of the master replica may be retrieved, or the data in the target storage disk may be directly extracted and checked, as well as the transmission log in the transmission information interface may be retrieved and detected, etc. In some embodiments, this solution is not limited.

S14: Write, after the client receives the acknowledgment character, the storage data into the slave replica and write the storage data into the disk.

It should be noted that, by the above method, asynchronous non-blocking information transmission may be achieved, that is, the client first receives the information that the transmission data of the master replica is written into the disk, then writes the storage data from the master replica to the slave replica, and then writes the storage data into the disk. In some embodiments, how the client receives the acknowledgment character is not limited. It can be understood that in S14, the client usually feeds back a new piece of writing information after receiving the character, thereby prompting the node program to start writing the storage data into the slave replica and writing the storage data into the disk.

According to the distributed storage system control method of some embodiments, after configuration is completed, replica data of a master replica and replica data of a slave replica in a node are written into a log. Meanwhile, transmission of a data storage instruction and writing of storage data are completed through the log. After storage data of the master replica is written, an acknowledgment character is fed back to a client. And after the client receives the acknowledgment character, writing of storage data into the slave replica is performed. Compared with the previous method of synchronizing the master replica and the slave replica, in the present application, data is written through log-based, namely, asynchronous non-blocking mode, that is, after the requester sends a request to the receiver, the client does not wait for a response that all slave replicas notifies the master replica and may proceed with other operations. Once the write operation is complete, the completion status and results are notified to the receiver before responding to the client through the master replica. Therefore, in the method, a storage data writing process between the client and a master replica process and a slave replica process is an asynchronous operation, and in a transmission process from the master replica to the slave replica, the client may still normally perform other operations without waiting and does not need to wait for a response after the writing of the master replica and the slave replica is completed as in an existing method, thereby greatly reducing the time cost of storage data writing.

Considering that the problem of master replica failure may occur in the process of data transmission, in some embodiments, according to the failure scenario, the integrity of data is fully considered and a solution is proposed. Before the writing, according to the data storage request, storage data into the log, writing the storage data into the master replica through the log, and writing the storage data into a disk, the method further includes:

writing the storage data into a backup log, where the backup log is a log stored in a solid-state storage hard disk through separate partition mounting;

extracting the storage data from the backup log and replicating the storage data to a substitute master replica when there is a failure during a process of writing the storage data into the slave replica and writing the storage data into the disk;

replicating the storage data in the substitute master replica to the slave replica; and performing a step of the writing the storage data into the slave replica, and writing the storage data into the disk when there is no failure during the process of writing the storage data into the slave replica and writing the storage data into the disk.

It should be noted that, in some embodiments, a backup log is described, and the backup log is a log stored in a solid-state storage hard disk through separate partition mounting. The solid-state storage hard disks are solid state drives (SSD). SSD is made by an array of solid-state electronic memory modules, and is composed of a control unit and a storage unit. The interface specification and definition, function, and usage method of SSD are the same as those of the traditional hard disk, and the product appearance and size are completely consistent with those of the traditional hard disk, but the I/O performance is greatly improved compared with that of the traditional hard disk.

Mounting refers to a process by which the operating system makes computer files and directories on a storage device (such as a hard disk, compact disc read-only memory (CD-ROM), or shared resource) accessible by the user through the file system of the computer. Therefore, it is easy to understand that the storage data transmitted by the backup log to the solid-state storage hard disk is generally performed by flushing.

FIG. 2 is a diagram of a data transmission failure handling method according to some embodiments of the present application. As shown in FIG. 2, when the storage is transmitted to the master replica and written into the disk, the transmission process fails, for example, the master replica goes down. At this time, the data of the slave replica has not been successfully written. A new replica is selected as the substitute master replica through monitoring by distributed storage Monitor process, and then the data will be rewritten according to the journal of the dump partition, and then the replica data will be continuously written, followed by dumping and recording into the journal mechanism. The log not only ensures that data is written correctly but also ensures data integrity and security by allowing data to be recovered through the log when there is a failure.

Considering that different nodes have different corresponding performances when selecting a target node, an idle node is selected, and a solution is proposed herein. Before the performing initial configuration on a target node in a distributed storage system, the method further includes:

detecting node resources of different nodes, where the node resources includes a memory usage rate and a central processing unit (CPU) usage rate of the node, as well as a unit ratio of a replica process disk; generating a weight value of each node according to the node resources, where the memory usage rate, the CPU usage rate, and the unit ratio of the replica process disk in the node resources are negatively correlated with the weight value; determining a request-response order in each node according to the weight value of each node, where the weight value is positively correlated with the request-response order; and selecting a node with a highest weight value as the target node.

It should be noted that the CPU interprets computer instructions and processes data in computer software. The CPU is the core component of a computer, responsible for reading, decoding, and executing instructions for all operations. Therefore, the CPU usage rate is the percentage of CPU occupied by the operation executed in the node, the memory usage rate is the usage of the disk storage memory in the node, and the unit ratio of the replica process disk is the percentage of the time in one second configured for I/O operation or the time in one second that the I/O queue is not empty. In some embodiments, only the weight value is limited to be negatively correlated with the above three parameters, and the weight value is not limited to how to calculate the weight value.

It may be understood that, according to the generated weight value data, idle conditions in different nodes may be roughly distinguished, that is, the larger the weight value is, the idler the node is, the smaller the operation instruction in the node is, and the smaller the data stored in the node is, whereby the most idle node may be selected as the target node according to the weight value, thereby ensuring the service processing speed of the target node to which the storage data is sent and the corresponding storage data space size.

To ensure that the space in the log may be reused, a solution is proposed herein, and the method further includes: deleting, every preset time, part or all of the log according to a situation of writing the storage data into the disk.

It should be noted that the step may be executed in the process of data storage and transmission or after the data storage and transmission is completed. The log may be selectively deleted according to the situation of writing the storage data into the disk. For example, it may be set that the log corresponding to the storage data may be deleted one minute after the storage data is written into the disk, and all the logs of the storage data transmission may be directly deleted after the entire node has completely completed the storage data transmission and the storage data of writing into the disk once, to achieve the effect of ensuring effective utilization of the storage space and the running program.

In the above embodiment, it is proposed that when writing the storage data, the log corresponding to the storage data may be deleted, to achieve the effect of ensuring the effective utilization of the storage space and the running program. Considering that when reading data, there may be a situation that the master replica has been written to the disk for persistent storage, but the slave replica has not been written to the disk, resulting in the problem of inconsistency of data reading, a solution is proposed herein, and the method further includes:

mapping, when a storage data read request is received, the storage data read request to a slave replica in the node with the highest weight value; determining whether a log corresponding to the storage data read request exists; in response to an existence of the log corresponding to the storage data read request, reading the storage data from the master replica; and in response to no existence of the log corresponding to the storage data read request, reading the storage data from the slave replica.

It can be understood that the mapping in some embodiments is an address mapping in the computer, that is, to ensure that the CPU may correctly access the storage unit when executing the instruction, the logical address in the user program is converted into a physical address directly addressed by the machine during running. In some embodiments, the physical address of the storage data in the disk is read by the CPU and corresponds to the logical address in the slave replica by mapping, thereby reading the required storage data.

It should be noted that, in some embodiments, the originating object of the storage data read request, the content of the request, and the request method are not limited. It can be understood that the log corresponding to the storage data read request refers to a log configured for data storage of the master replica and the slave replica corresponding to the storage data. As can be seen from the above embodiment, when the storage data is written into the disk, the log is completely deleted. Thus, detecting whether the log exists may determine whether all the storage data is written into the disk, thereby ensuring the accuracy of the read storage data.

In the above embodiment, there is no limitation on how to perform the initial configuration on the target node in the distributed storage system, and a solution is proposed herein. The performing initial configuration on a target node in a distributed storage system includes:

controlling the client to establish a link with Monitor, acquiring address information about a cluster, and sending a handle of the cluster to the Monitor; controlling the target node to receive configuration information fed back from the Monitor; and controlling the target node to read cluster configuration parameters in the Monitor and receive configuration files that has been set.

Cluster is a mobile communication system configured for group dispatching and command communication, which is mainly applied in the field of professional mobile communication. The available channels of the system may be shared by all users of the system. The system, with the function of automatic channel selection, is a multi-purpose and high-performance wireless scheduling communication system that shares resources, costs, channel equipment, and services.

Handle is the foundation of the whole Windows programming. A handle refers to a unique integer value, i.e., a 4-byte (8 bytes in a 64-bit program) long value, configured to identify different objects in an application program and different examples of the same kind of objects, such as a window, button, icon, scroll bar, output device, control, or file. The application program may access the information of the corresponding object through the handle.

The Monitor is a monitoring program of the distributed storage system in some embodiments. It can be understood that the monitoring program records previously written configuration parameters, and monitors and detects the current configuration parameters, running state, and the like of the distributed storage system. Through communicating with Monitor, the initial configuration of the target node, that is, the running of the distributed storage system, is completed, thus achieving the effect of ensuring effective utilization of the storage space and the running program.

Considering that it is mentioned in the above embodiment that data of the slave replica is also required to be written into the disk, a solution is proposed herein, and the method further includes:

controlling, after the data storage request is responded to, the slave replica to feed back an acknowledgment character to the client.

Figure 3:
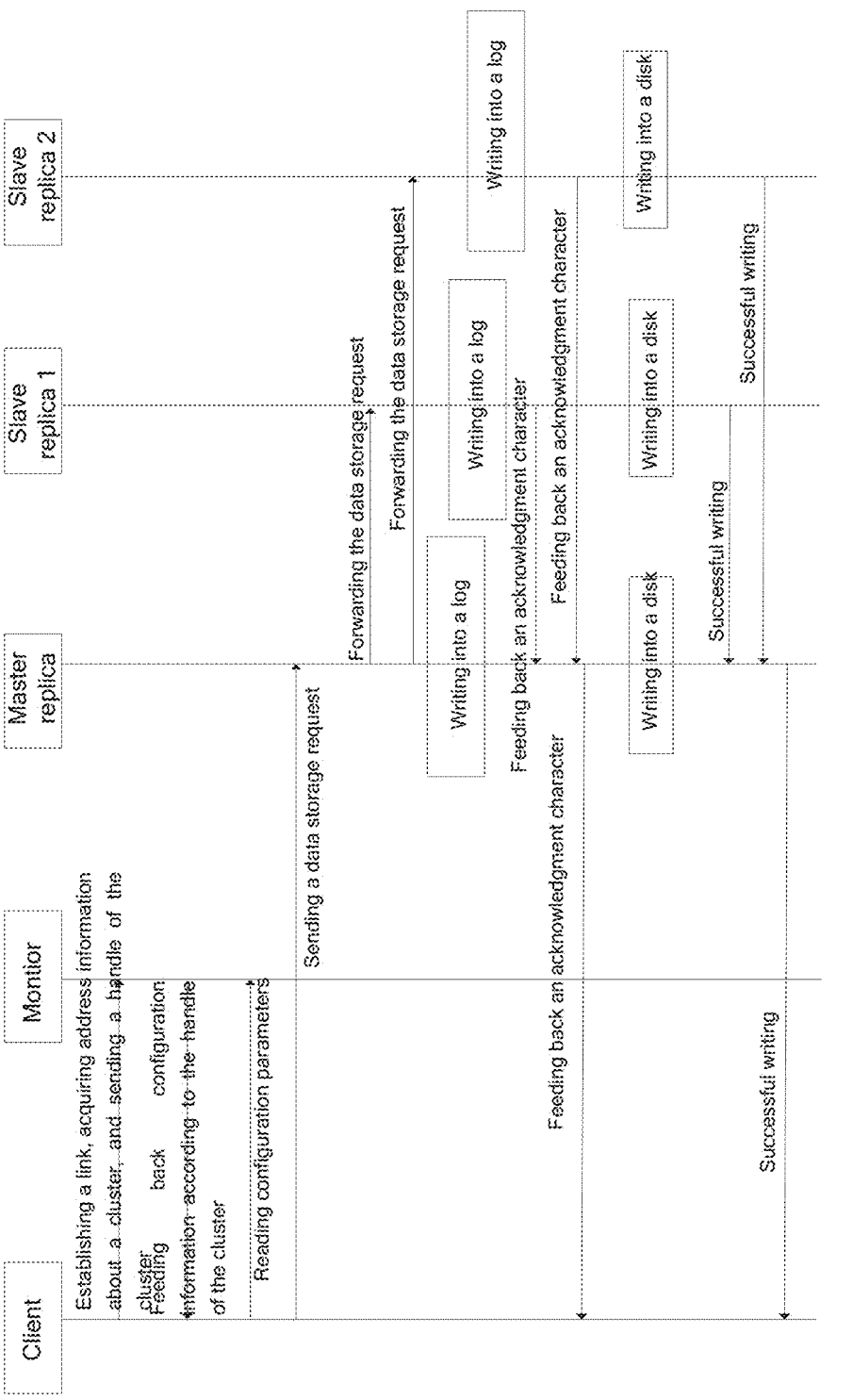
FIG. 3 is a flowchart of a data writing method of a distributed storage system according to some embodiments of the present application.

FIG. 3 is a flowchart of a data writing method of a distributed storage system according to some embodiments of the present application. As shown in FIG. 3, the solution is a relatively complete data writing method in the present application. Finally, the data writing process is finished by feeding back the acknowledgment character through the slave replica to the client, to notify the client to perform subsequent processing such as ending the process or powering off, thereby achieving the effect of saving resources.

In the above embodiments, the distributed storage system control method is described in detail, and the present application further provides embodiments corresponding to the distributed storage system control apparatus. It should be noted that the present application describes embodiments of the apparatus portion from two perspectives, one is based on the perspective of functional modules, and the other is based on the perspective of hardware.

Figure 4:
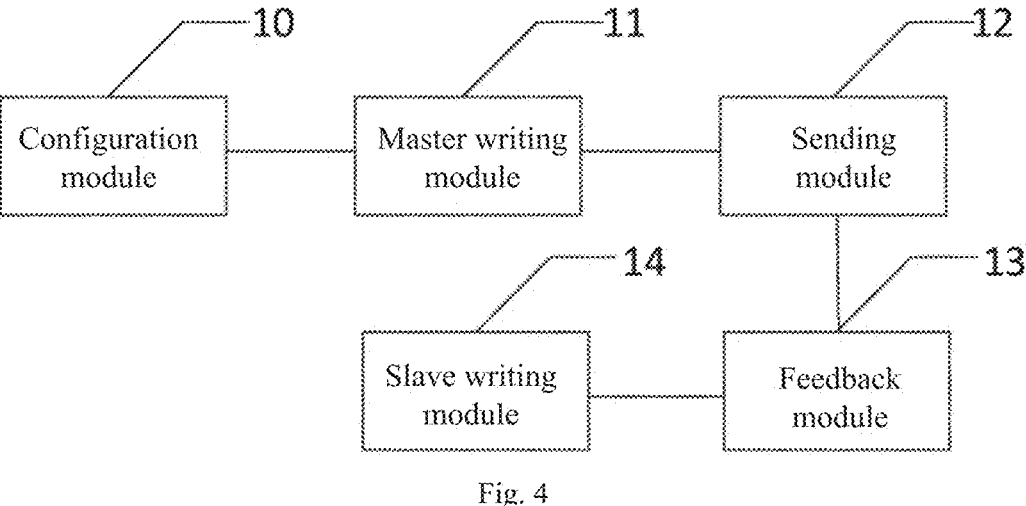
FIG. 4 is a diagram of a distributed storage system control apparatus according to some embodiments of the present application.

FIG. 4 is a diagram of a distributed storage system control apparatus according to some embodiments of the present application; the apparatus includes:

a configuration module 10, configured to perform initial configuration on a target node in a distributed storage system, the target node being a node in the distributed storage system;

a master writing module 11, configured to write, after the target node receives a data storage request, replica data of a master replica and replica data of a slave replica of the target node into a log, and record the data storage request in the log;

a sending module 12, configured to write, according to the data storage request, storage data into the log, write the storage data into the master replica through the log and write the storage data into a disk;

a feedback module 13, configured to control, after the storage data is successfully written into the disk, the master replica to feed back an acknowledgment character to a client; and a slave writing module 14, configured to write, after the client receives the acknowledgment character, the storage data into the slave replica and write the storage data into the disk.

In some embodiments, the apparatus further includes:

a backup writing module, configured to write the storage data into a backup log, where the backup log is a log stored in a solid-state storage hard disk through separate partition mounting;

an extraction module, configured to extract the storage data from the backup log and replicate the storage data to a substitute master replica when there is a failure during the process of writing the storage data into the slave replica, and write the storage data into the disk; and a replication module, configured to replicate the storage data in the substitute master replica to the slave replica.

In some embodiments, the apparatus further includes:

a detection module, configured to detect node resources of different nodes, where the node resources includes a memory usage rate and a CPU usage rate of the node, and a unit ratio of a replica process disk;

a weight generation module, configured to generate a weight value of each node according to the node resource, where the memory usage rate, the CPU usage rate, and the unit ratio of the replica process disk in the node resources are negatively correlated with the weight value;

a response determination module, configured to determine a request-response order in each node according to the weight value of each node, where the weight value is positively correlated with the request-response order; and a selection module, configured to select a node with a highest weight value as the target node.

In some embodiments, the apparatus further includes:

a deletion module, configured to delete, every preset time, part or all of the log according to a situation of writing the storage data into the disk.

In some embodiments, the apparatus further includes:

a mapping module, configured to map, when a storage data read request is received, the storage data read request to a slave replica in the node with the highest weight value;

a determination module, configured to determine whether a log corresponding to the storage data read request exists, in response to an existence of the log corresponding to the storage data read request, turning on a master read module, and in response to no existence of the log corresponding to the storage data read request, turning on a slave read module;

a master read module, configured to read the storage data from the master replica; and a slave read module, configured to read the storage data from the slave replica.

Since the embodiments of the apparatus portion correspond to the embodiments of the method portion each other, the embodiments of the apparatus portion and the corresponding beneficial effects thereof are described in the description of the embodiments of the method portion, and will not be repeated here.

Figure 5:
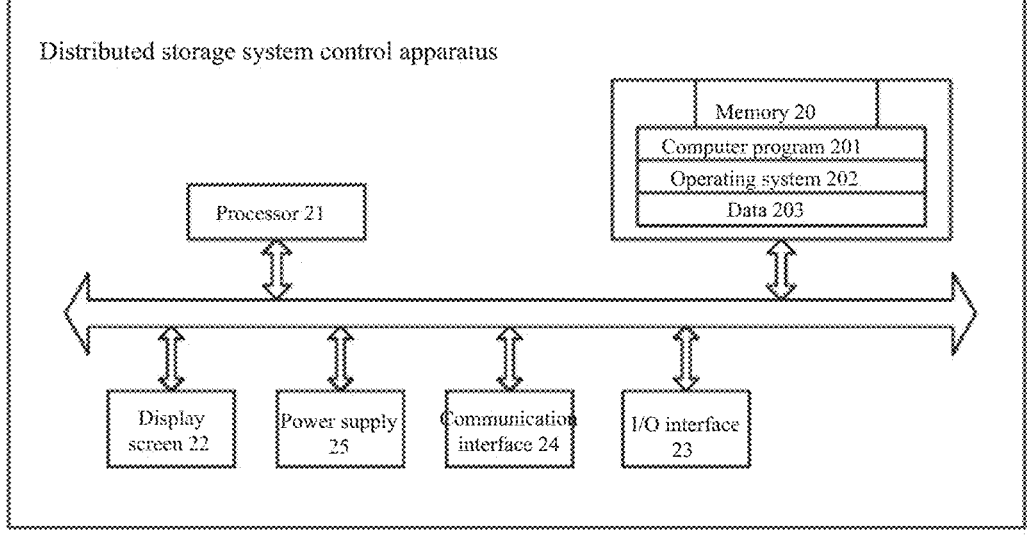
FIG. 5 is a structural diagram of the distributed storage system control apparatus according to another embodiment of the present application.

FIG. 5 is a structural diagram of a distributed storage system control apparatus according to another embodiment of the present application. As shown in FIG. 5, the distributed storage system control apparatus includes: a memory 20, configured to store computer programs; and a processor 21, configured to implement steps of the distributed storage system control method of the above embodiments when executing the computer programs.

The distributed storage system control apparatus provided by the embodiments may include but is not limited to, a smartphone, a tablet, a notebook computer, or a desktop.

The processor 21 may include one or more processing cores, such as a 4-core processor or an 8-core processor. The processor 21 may be implemented in at least one hardware form of digital signal processing (DSP), field-programmable gate array (FPGA), and programmable logic array (PLA). The processor 21 may further include a main processor and a co-processor; the main processor is a processor for processing data in a wake-up state, and is also called a CPU; the coprocessor is a low-power processor for processing data in a standby state. In some embodiments, the processor 21 may be integrated with a graphics processing unit (GPU), and the GPU is configured to be responsible for rendering and drawing the content that the display screen needs to display. In some embodiments, the processor 21 may further include an artificial intelligence (AI) processor, and the AI processor is configured to process computing operations related to machine learning.

The memory 20 may include one or more computer-readable storage media, and the computer-readable storage media may be non-transitory. The memory 20 may further include a high-speed random-access memory (RAM), as well as a non-transitory memory, such as one or more magnetic disk storage devices and flash memory storage devices. In some embodiments, memory 20 is at least configured to store the following computer program 201; the computer program, after being loaded and executed by processor 21, is capable of implementing the related steps of the distributed storage system control method disclosed in any of the foregoing embodiments. In addition, the resources stored in the memory 20 may further include an operating system 202 and data 203, and the storage mode may be transient storage or permanent storage. The operating system 202 may include Windows, Unix, Linux, and the like. The data 203 may include, but is not limited to, data involved in the distributed storage system control method, and the like.

In some embodiments, the distributed storage system control apparatus may further include a display screen 22, an I/O interface 23, a communication interface 24, a power supply 25, and a communication bus 26.

It will be understood by the skilled in the art that the structure shown in FIG. 5 is not to be construed as limiting the distributed storage system control apparatus and may include more or fewer assemblies than those shown.

The distributed storage system control apparatus according to some embodiments of the present application includes a memory and a processor; the processor, when executing programs stored in the memory, may implement the following method, namely, the distributed storage system control method according to the above embodiments.

Since the embodiments of the apparatus portion correspond to the embodiments of the method portion each other, the embodiments of the apparatus portion and the corresponding beneficial effects thereof are described in the description of the embodiments of the method portion, which will not be repeated here.

Finally, the present application further provides a corresponding embodiment of a non-transitory readable storage medium. The non-transitory readable storage medium stores thereon computer programs that, when executed by the processor, implement steps described in the above method embodiments.

It will be appreciated that the method of the above embodiments if implemented in the form of a software function unit and sold or used as a stand-alone product, may be stored in a non-transitory readable storage medium. Based on such an understanding, the technical solution of the present application, either substantively or in any part contributing to the prior art, or all or part of the technical solution, may be embodied in the form of a software product; the computer software product is stored in a storage medium for executing all or part of the steps of various method embodiments of the present application. The foregoing storage medium may include various media that may store the program code, such as U-disk, removable hard disk, ROM, random access memory (RAM), and magnetic or optical disks.

Since some embodiments of the non-transitory readable storage medium portion corresponds to some embodiments of the method portion each other, some embodiments of the apparatus portion and the corresponding beneficial effects thereof are described in the description of some embodiments of the method portion, and will not be repeated here.

The distributed storage system control method and apparatus, and the readable storage medium provided in the present application have been described in detail above. Various embodiments are described in the specification progressively, with each embodiment focusing on differences from the other embodiments, and with reference to the same or similar parts of the various embodiments. The apparatus disclosed in the embodiments is relatively simple to describe since it corresponds to the method disclosed in the embodiments, as explained in the method section. For the ordinarily skilled in the technical field, without deviating from the principle of the present application, several improvements and modifications may also be made to the present application, and these improvements and modifications also fall within the scope of protection of the claims of the present application.

It should also be noted that the relational terms such as first, second, and the like in the specification are used solely to distinguish one entity or operation from another entity or operation without necessarily requiring or implying any actual relationship or order between such entities or operations. Furthermore, the terms "include", "include", or any other variation thereof, are intended to cover a non-exclusive inclusion, such that a process, method, article, or device including a list of elements does not include only those elements but may include other elements not expressly listed or inherent to such process, method, article, or device. An element proceeded by "include a . . . " does not, without more constraints, preclude the existence of additional identical elements in the process, method, article, or device that includes the element.

The invention claimed is:

1. A distributed storage system control method, comprising:

performing initial configuration on a target node in a distributed storage system, wherein the target node is a node in the distributed storage system;

writing, after the target node receives a data storage request, replica data of a master replica and replica data of a slave replica of the target node into a log, and recording the data storage request in the log;

writing, according to the data storage request, storage data into the log, writing the storage data into the master replica through the log, and writing the storage data into a disk;

controlling, after the storage data is successfully written into the disk, the master replica to feed back an acknowledgment character to a client; and writing, after the client receives the acknowledgment character, the storage data into the slave replica and writing the storage data into the disk;

wherein before the performing initial configuration on a target node in a distributed storage system, the method further comprises:

detecting node resources of different nodes, wherein the node resources comprises a memory usage rate and a central processing unit (CPU) usage rate of the node, as well as a unit ratio of a replica process disk;

generating a weight value of each node according to the node resources, wherein the memory usage rate, the CPU usage rate, and the unit ratio of the replica process disk in the node resources are negatively correlated with the weight value;

determining a request-response order in each node according to the weight value of each node, wherein the weight value is positively correlated with the request-response order; and selecting a node with a highest weight value as the target node.

2. The distributed storage system control method according to claim 1, wherein before the writing, according to the data storage request, storage data into the log, writing the storage data into the master replica through the log, and writing the storage data into a disk, the method further comprises:

writing the storage data into a backup log, wherein the backup log is a log stored in a solid-state storage hard disk through separate partition mounting;

extracting the storage data from the backup log and replicating the storage data to a substitute master replica when there is a failure during a process of writing the storage data into the slave replica and writing the storage data into the disk;

replicating the storage data in the substitute master replica to the slave replica; and performing a step of the writing the storage data into the slave replica, and writing the storage data into a disk when there is no failure during the process of writing the storage data into the slave replica and writing the storage data into the disk.

3. The distributed storage system control method according to claim 1, further comprising:

deleting, every preset time, part or all of the log according to a situation of writing the storage data into the disk.

4. The distributed storage system control method according to claim 1, further comprising: mapping, when a storage data read request is received, the storage data read request to a slave replica in the node with the highest weight value; determining whether a log corresponding to the storage data read request exists; in response to an existence of the log corresponding to the storage data read request, reading the storage data from the master replica; and in response to no existence of the log corresponding to the storage data read request, reading the storage data from the slave replica.

5. The distributed storage system control method according to claim 1, wherein the performing initial configuration on a target node in a distributed storage system comprises:

controlling the client to establish a link with Monitor, acquiring address information about a cluster, and sending a handle of the cluster to the Monitor;

controlling the target node to receive configuration information fed back from the Monitor; and controlling the target node to read cluster configuration parameters in the Monitor and receive configuration files that has been set.

6. The distributed storage system control method according to claim 4, further comprising:

controlling, after the data storage request is responded to, the slave replica to feed back an acknowledgment character to the client.

7. The distributed storage system control method according to claim 1, wherein the target node is an idle node.

8. The distributed storage system control method according to claim 1, wherein before the controlling, after the storage data is successfully written into the disk, the master replica to feed back an acknowledgment character to a client, the method further comprises:

confirming whether the storage data is successfully written into the disk by retrieving a data transmission process of the log of the master replica.

9. The distributed storage system control method according to claim 1, wherein before the controlling, after the storage data is successfully written into the disk, the master replica to feed back an acknowledgment character to a client, the method further comprises:

confirming whether the storage data is successfully written into the disk by extracting and checking data in a target storage disk.

10. The distributed storage system control method according to claim 1, wherein before the controlling, after the storage data is successfully written into the disk, the master replica to feed back an acknowledgment character to a client, the method further comprises:

confirming whether the storage data is successfully written into the disk by retrieving and detecting a transmission log in a transmission information interface.

11. The distributed storage system control method according to claim 1, wherein the writing the storage data into the master replica through the log and writing the storage data into a disk comprises:

writing the storage data into the master replica through the log and flushing the same to the disk.

12. The distributed storage system control method according to claim 2, wherein before the extracting the storage data from the backup log and replicating the storage data to a substitute master replica, the method further comprises:

selecting a new replica as the substitute master replica through monitoring by a distributed storage Monitor process.

13. The distributed storage system control method according to claim 4, wherein the determining a request-response order in each node according to the weight value of each node comprises:

determining an idle condition in each node according to the weight value of each node, wherein the larger the weight value of the node is, the more idle the node is; the smaller an operation instruction in the node is, the smaller data stored in the node is; and determining the request-response order in each node according to the idle condition in each node.

14. The distributed storage system control method according to claim 13, wherein the target node is a most idle node.

15. The distributed storage system control method according to claim 4, wherein the reading the storage data from the slave replica comprises:

reading physical addresses of the storage data, and corresponding the physical addresses of the storage data to logical addresses in the slave replica through mapping to read the storage data.

16. The distributed storage system control method according to claim 1, wherein the performing initial configuration on a target node in a distributed storage system comprises:

performing configuration to an interface type and a corresponding configuration information transmission process in the distributed storage system.

17. The distributed storage system control method according to claim 1, wherein the writing, after the client receives the acknowledgment character, the storage data into the slave replica and writing the storage data into the disk comprises:

prompting, after the client feeds back a new piece of writing information after receiving the character, a node program to write the storage data into the slave replica and writing the storage data into the disk.

18. A distributed storage system control apparatus, comprising:

at least one processor; and a memory storing computer programs executable on the at least one processor, wherein the at least one processor executes the computer programs to:

perform initial configuration on a target node in a distributed storage system, wherein the target node is a node in the distributed storage system;

write, after the target node receives a data storage request, replica data of a master replica and replica data of a slave replica of the target node into a log, and record the data storage request in the log;

write, according to the data storage request, storage data into the log, write the storage data into the master replica through the log, and write the storage data into a disk;

control, after the storage data is successfully written into the disk, the master replica to feed back an acknowledgment character to a client; and write, after the client receives the acknowledgment character, the storage data into the slave replica and write the storage data into the disk;

detect node resources of different nodes, wherein the node resources comprises a memory usage rate and a central processing unit (CPU) usage rate of the node, as well as a unit ratio of a replica process disk;

generate a weight value of each node according to the node resources, wherein the memory usage rate, the CPU usage rate, and the unit ratio of the replica process disk in the node resources are negatively correlated with the weight value;

determine a request-response order in each node according to the weight value of each node, wherein the weight value is positively correlated with the request-response order; and select a node with a highest weight value as the target node.

19. A non-transitory readable storage medium, wherein the non-transitory readable storage medium stores computer programs thereon, the computer programs are executable by a processor, and when executed by the processor, are configured to cause the processor to:

perform initial configuration on a target node in a distributed storage system, wherein the target node is a node in the distributed storage system;

write, after the target node receives a data storage request, replica data of a master replica and replica data of a slave replica of the target node into a log, and record the data storage request in the log;

write, according to the data storage request, storage data into the log, write the storage data into the master replica through the log, and write the storage data into a disk;

control, after the storage data is successfully written into the disk, the master replica to feed back an acknowledgment character to a client; and write, after the client receives the acknowledgment character, the storage data into the slave replica and write the storage data into the disk;

detect node resources of different nodes, wherein the node resources comprises a memory usage rate and a central processing unit (CPU) usage rate of the node, as well as a unit ratio of a replica process disk;

generate a weight value of each node according to the node resources, wherein the memory usage rate, the CPU usage rate, and the unit ratio of the replica process disk in the node resources are negatively correlated with the weight value;

determine a request-response order in each node according to the weight value of each node, wherein the weight value is positively correlated with the request-response order; and select a node with a highest weight value as the target node.

* * * * *